United States Patent
Sakai et al.

(10) Patent No.: US 11,055,858 B2
(45) Date of Patent: Jul. 6, 2021

(54) METHOD AND APPARATUS FOR MEASURING MEANDERING AMOUNT OF STRIP, AND METHOD AND APPARATUS FOR DETECTING ABNORMAL MEANDERING OF STRIP

(71) Applicant: JFE Steel Corporation, Tokyo (JP)

(72) Inventors: Jun Sakai, Tokyo (JP); Toru Nakashima, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 16/493,120

(22) PCT Filed: Mar. 9, 2018

(86) PCT No.: PCT/JP2018/009252
§ 371 (c)(1),
(2) Date: Sep. 11, 2019

(87) PCT Pub. No.: WO2018/168700
PCT Pub. Date: Sep. 20, 2018

(65) Prior Publication Data
US 2020/0082550 A1 Mar. 12, 2020

(30) Foreign Application Priority Data

Mar. 14, 2017 (JP) .............................. JP2017-048550

(51) Int. Cl.
*G06T 7/246* (2017.01)
*G06T 7/13* (2017.01)
(Continued)

(52) U.S. Cl.
CPC .............. *G06T 7/248* (2017.01); *G01B 11/26* (2013.01); *G06T 7/001* (2013.01); *G06T 7/13* (2017.01);
(Continued)

(58) Field of Classification Search
CPC .......... G06T 7/248; G06T 7/13; G06T 7/001; G06T 2207/30136; G06T 7/0006;
(Continued)

(56) References Cited

U.S. PATENT DOCUMENTS

2002/0154308 A1* 10/2002 Uesugi .................. G01N 21/89
356/431
2004/0057046 A1* 3/2004 Abbott ................. G01B 11/306
356/239.1
(Continued)

FOREIGN PATENT DOCUMENTS

| CN | 101592882 A | 12/2009 |
|---|---|---|
| CN | 101968617 A | 2/2011 |

(Continued)

OTHER PUBLICATIONS

1st Office Action issued in counterpart Taiwanese Application No. 107108676 dated Oct. 30, 2018.
(Continued)

*Primary Examiner* — Tung T Vo
(74) *Attorney, Agent, or Firm* — DLA Piper LLP (US)

(57) ABSTRACT

A method measures a meandering amount of a strip, which is capable of reducing troubles. In the method of measuring a meandering amount of a strip during conveyance, an imaging means is arranged in one side of the strip at a state of tilting an optical axis thereof to a pass line plane of the strip and a light is arranged in the other side of the strip to irradiate light to the strip from the back of the strip viewing from the imaging means, and the strip is shot by the imaging means from an oblique side to include both edges of the strip and the edge of the strip is detected with an image shot by the imaging means and a meandering amount of the strip is calculated based on the detected edge position information of the strip from a standard position.

8 Claims, 8 Drawing Sheets

(51) Int. Cl.
  *G01B 11/26* (2006.01)
  *G06T 7/00* (2017.01)
  *H04N 5/225* (2006.01)
  *G11B 11/26* (2006.01)

(52) U.S. Cl.
  CPC . *H04N 5/2256* (2013.01); *G06T 2207/30136* (2013.01)

(58) Field of Classification Search
  CPC ......... G06T 7/60; G01B 11/26; G01B 11/028; G01B 11/24; H04N 5/2256; B21B 38/00
  USPC .......................................................... 348/88
  See application file for complete search history.

(56) References Cited

U.S. PATENT DOCUMENTS

| | | | |
|---|---|---|---|
| 2005/0155419 A1* | 7/2005 | Naruoka | G01B 11/028 73/159 |
| 2009/0087231 A1 | 4/2009 | Masaki et al. | |
| 2009/0278303 A1* | 11/2009 | Fuwa | B65H 23/038 271/225 |
| 2009/0294256 A1 | 12/2009 | Okamoto et al. | |
| 2010/0260378 A1* | 10/2010 | Noy | G06T 7/12 382/103 |
| 2010/0310149 A1* | 12/2010 | Kim | G01B 11/028 382/141 |
| 2012/0204614 A1* | 8/2012 | Isei | G01N 21/89 72/12.8 |
| 2012/0327227 A1 | 12/2012 | Ikeda et al. | |
| 2013/0021472 A1 | 1/2013 | Iwase et al. | |
| 2013/0098127 A1* | 4/2013 | Isei | B21C 51/00 72/17.3 |
| 2016/0203596 A1* | 7/2016 | Kodama | B23K 26/262 382/152 |
| 2017/0182534 A1* | 6/2017 | Goto | B21B 1/26 |
| 2019/0370995 A1* | 12/2019 | Yonekura | C23C 2/20 |

FOREIGN PATENT DOCUMENTS

| | | |
|---|---|---|
| CN | 106028024 A | 10/2016 |
| EP | 2 600 140 A1 | 6/2013 |
| EP | 3076148 A1 | 10/2016 |
| JP | 62-54109 A | 3/1987 |
| JP | 3-109105 U | 11/1991 |
| JP | H04-98971 A | 3/1992 |
| JP | 4-225107 A | 8/1992 |
| JP | 9-189545 A | 7/1997 |
| JP | 10-318719 A | 12/1998 |
| JP | 2001-051556 A | 2/2001 |
| JP | 2002-181513 A | 6/2002 |
| JP | 2011-099821 A | 5/2011 |
| JP | 2012-251816 A | 12/2012 |
| JP | 2014-122832 A | 7/2014 |
| TW | 200628756 A | 8/2006 |
| WO | 2013/011586 A1 | 1/2013 |
| WO | 2013/080093 A1 | 6/2013 |

OTHER PUBLICATIONS

2nd Office Action issued in counterpart Taiwanese Application No. 107108676 dated Jun. 26, 2019.
The Extended European Search Report dated Jan. 24, 2020, of counterpart European Application No. 18767716.6.
First Office Action dated Sep. 14, 2020, of counterpart Korean Application No. 10-2019-7026385, along with a Concise Statement of Relevance of Office Action in English.
The First Office Action dated Oct. 20, 2020, of counterpart Chinese Application No. 201880015887.8, along with a Search Report in English.

* cited by examiner

Detection line (dotted line) indicating automatically detected back side edge

Detection line (dotted line) indicating automatically detected near side edge

FIG. 6(b)

Detection line (dotted line) indicating automatically detected back side edge

Detection line (dotted line) indicating automatically detected near side edge

FIG. 6(c)

Detection line (dotted line) indicating automatically detected back side edge

Detection line (dotted line) indicating automatically detected near side edge

METHOD AND APPARATUS FOR MEASURING MEANDERING AMOUNT OF STRIP, AND METHOD AND APPARATUS FOR DETECTING ABNORMAL MEANDERING OF STRIP

TECHNICAL FIELD

This disclosure relates to a method and apparatus for measuring a meandering amount of a strip during conveyance thereof and further to a method and apparatus for detecting abnormal meandering of the strip based on the measured results.

BACKGROUND

Figure 1:
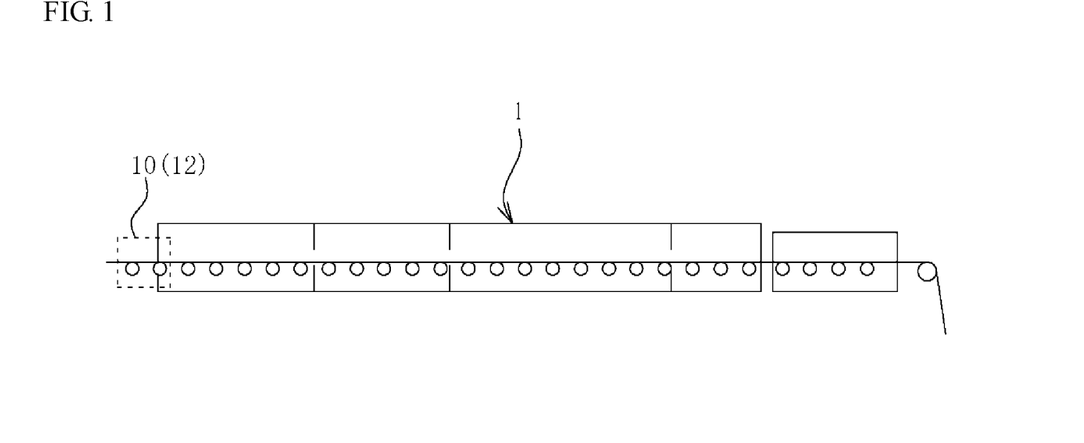
FIG. 1 is a schematic view illustrating a horizontal furnace body in a continuous annealing equipment adopting an apparatus for measuring a meandering amount and an apparatus for detecting abnormal meandering according to an example.

In the production of a steel sheet as a strip, the steel sheet may be conveyed over a long distance. For example, a furnace for annealing the steel sheet is disposed in a continuous annealing equipment for annealing the steel sheet subjected to rolling or the like, and a heating zone, a soaking zone, a cooling zone and so on are sequentially arranged in the furnace from an upstream side in the conveyance direction of the steel sheet. In conducting annealing in a vertical furnace while folding the steel sheet up and down, a central position of the steel sheet can be adjusted by deflector rolls, steering rolls and the like during the conveyance. On the other hand, in conducting annealing in a horizontal furnace as shown in FIG. 1 while conveying the steel sheet straight without folding, the steel sheet is liable to meander due to no existence of deflector rolls or steering rolls. As the meandering becomes excessive, it is feared the meandered steel sheet contacts with equipment such as mount, poles and so on in the vicinity of the line and brings about serious trouble such as sheet breakage and the like so that it is important to detect abnormal meandering of the steel sheet to prevent such trouble.

As a method of detecting meandering of the steel sheet during conveyance has hitherto been known a method wherein the steel sheet is shot with an imaging means such as CCD camera or the like and an edge position of the steel sheet is automatically detected by processing the shot image to obtain shifting amount of the edge position from the standard position as a meandering amount.

As such a technique, JP H04-225107 A proposes a method wherein CCD cameras are arranged above both edges of the steel sheet and light sources are arranged behind the steel sheet in correspondence to the CCD cameras and light is irradiated from the light source toward the CCD camera to detect the edge of the steel sheet.

In the method of JP '107, however, the CCD camera is arranged right above the steel sheet and the light source is arranged right below the steel sheet so that dust such as metal powder and the like scattering in association with the conveyance of the steel sheet is apt to be adhered to the lens of the CCD camera and the light source to cause operation failure, false detection or the like. To avoid this problem, the CCD camera and so on can be arranged on a truck capable of drawing toward the outside of the line, whereby the dust adhered to the CCD camera or the like can be periodically removed even in the operation. However, such a countermeasure has a drawback that the truck, laying of rails guiding the truck, securing existing floor to position the truck, improvement of beams and, if necessary, change of the existing pass line are required to bring about the excessive investment cost. In addition, as being arranged in places easily subjected to an influence of heat from the steel sheet, CCD camera and the light source may be damaged early due to heat from the steel sheet. Therefore, it necessary to separately arrange a water-cooling equipment to protect the CCD camera or the like by cooling.

It could therefore be helpful to provide a method and apparatus for measuring a meandering amount of a strip and a method and apparatus for detecting abnormal meandering of the strip capable of reducing troubles such as operation failure and false detection by suppressing adhesion of dust to the imaging means and lights and can decrease heat load to the imaging means and the lights to suppress an increase in cost.

SUMMARY

We thus provide:

A method of measuring a meandering amount of a strip during conveyance thereof, wherein an imaging means is arranged in one side of the strip at a state of tilting an optical axis thereof to a pass line plane of the strip and a lighting is arranged in the other side of the strip to irradiate light to the strip from the back of the strip viewing from the imaging means, and the strip is shot by the imaging means from an obliquely side to include both edges of the strip and the edge of the strip is detected with an image shot by the imaging means and a meandering amount of the strip from a standard position is calculated based on the detected edge position information of the strip.

It is preferable that the lighting and the imaging means are arranged at the same positions in the conveyance direction of the strip and an optical axis of the lighting is shifted to an optical axis of the imaging means toward an upstream side or a downstream side in the conveyance direction of the strip.

It is preferable that the meandering amount of the strip is regressively measured from the detected edge position information of the strip.

The apparatus that measures a meandering amount of a strip during conveyance thereof, comprises an imaging means arranged in one side of the strip and having an optical axis tilted to a pass line plane of the strip for shooting the strip from an obliquely side to include both edges of the strip, a light irradiating light to the strip from the back of the strip viewing from the imaging means, and an image processing device that processes an image shot by the imaging means to detect the edge of the strip and calculate a meandering amount of the strip from a standard position based on the detected edge position information of the strip.

It is preferable that the light and the imaging means are arranged at the same positions in the conveyance direction of the strip and an optical axis of the light is shifted to an optical axis of the imaging means toward an upstream side or a downstream side in the conveyance direction of the strip.

It is preferable that the image processing device is configured to regressively obtain the meandering amount of the strip from the detected edge position information of the strip.

The method of detecting abnormal meandering lies in that abnormal meandering is judged when a meandering amount measured in the aforementioned method of measuring a meandering amount exceeds a predetermined abnormal judgement value.

The apparatus that detects abnormal meandering comprises any one of the aforementioned apparatuses that measure a meandering amount and is configured so that the image processing device judges abnormal meandering when the measured meandering amount exceeds a predetermined abnormal judgement value.

In the method and apparatus for measuring a meandering amount, the lighting irradiates light to transmit the light from the edge of the strip, and the imaging means shoots the strip including the edge, and the image processing device detects the edge from the shot image and measures the meandering amount of the strip based on the detected edge position information. The abnormal meandering is judged by comparing the measured meandering amount with the predetermined abnormal judgement value.

The imaging means is arranged in one side of the strip, and the lighting is arranged in the other side of the strip, or the imaging means and the lighting are not located right above and below the strip so that there can be reduced operation failure due to the adhesion of dust and so on scattering in association with the conveyance of the steel sheet to lens of the imaging means and the lighting. Accordingly, the truck and rail that draws the imaging means and the light toward outside and the reconstruction of the existing equipment associated therewith can be made unnecessary, and cost required for the introduction of devices can be reduced. Also, even when the temperature of the strip is high, the side of the strip arranged with the imaging means and the light has a low temperature compared to positions right above and below the strip so that water cooling device for the imaging means and the light can be made unnecessary. Furthermore, the imaging means and the light are arranged outside the line so that there is a merit that repair and adjustment of the imaging means and the lighting can be performed during the operation without stopping the operation and maintenance thereof can be performed easily.

Therefore, it is possible to solve the problems of the conventional technique and provide the method and apparatus for measuring a meandering amount of a strip and the method and apparatus for detecting abnormal meandering of a strip which are capable of suppressing the adhesion of dust to the imaging means and the light to reduce trouble such as operation failure and false detection and reducing heat load to the imaging means and the lighting to suppress an increase in cost.

BRIEF DESCRIPTION OF THE DRAWINGS

FIGS. 3(*a*)-3(*b*) show a conveyance line arranged with the apparatus for detecting abnormal meandering of FIG. 2, wherein (a) is a view showing a face opposite to the conveyance direction and (b) is a plan view.

FIGS. 6(*a*)-6(*c*) are screen examples displaying an image shot by an imaging means and a detection line passing through an automatically detected edge position on a monitor in the apparatus that detects abnormal meandering according to the example.

REFERENCE SIGNS LIST

10 apparatus for detecting abnormal meandering
12 apparatus for measuring meandering amount
14 camera
16 light
18 image processing device
20 power source
22 monitor
24 conveyance roll
26 cover

DETAILED DESCRIPTION

An example will be described in detail with reference to the drawings below. FIG. 1 is a schematic view illustrating a horizontal furnace body in a continuous annealing equipment adopting an apparatus that measures a meandering amount and an apparatus that detects abnormal meandering according to an example.

In the continuous annealing equipment, a furnace body 1 as shown in FIG. 1 is provided between an entry-side device, which is not shown, having a pay-off reel and the like and an exit-side device, which is also not shown, having a winding reel and the like. The illustrated furnace body is a horizontal type that conducts annealing while conveying a steel sheet straight, in which meandering is easily caused because of no existence of deflector rolls and steering rolls. In this example, therefore, an apparatus 10 that detects abnormal meandering is arranged in front of the furnace body 1 to measure a meandering amount of the steel sheet and detect abnormal meandering before the steel sheet is conveyed into the furnace body 1.

Figure 2:
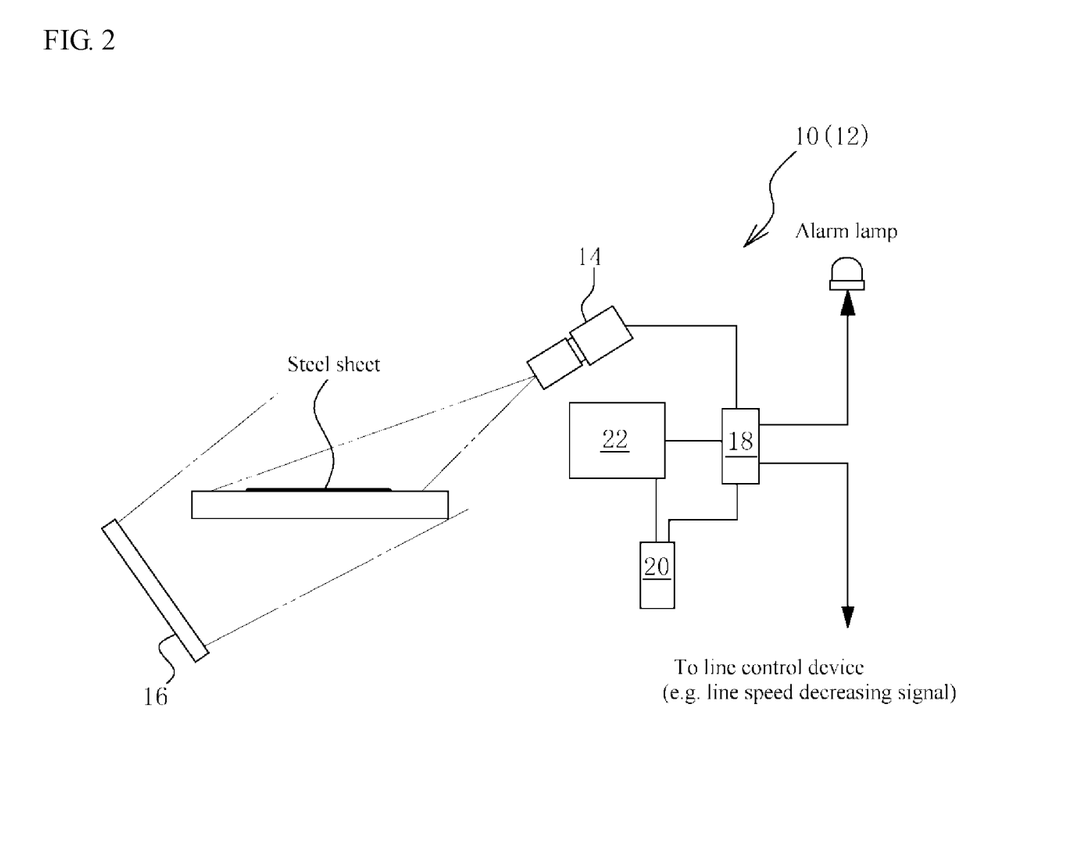
FIG. 2 is a schematic view illustrating a construction of the apparatus for detecting abnormal meandering according to an example provided with the apparatus for measuring the meandering amount according to an example.

The apparatus 10 that detects abnormal meandering according to this example possesses a function as an apparatus 12 that measures a meandering amount. The apparatus 10 measures a meandering amount of the steel sheet as an example of a strip travelling a conveyance roll and detects abnormal meandering based on the measured meandering amount. As a constructional example thereof is shown in FIG. 2, the apparatus 10 comprises mainly a digital camera 14 such as CCD camera, CMOS camera or the like capable of continuously shooting the steel sheet as an imaging means, a light 16, an image processing device 18, a power source 20 and a monitor 22.

Figure 3A:
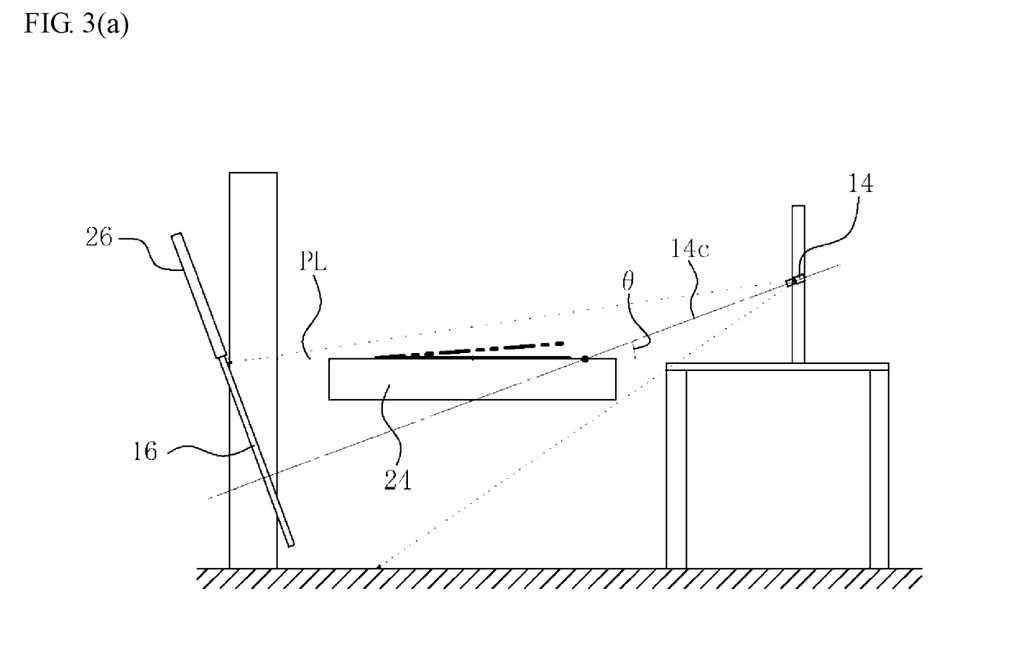
Figure 3B:
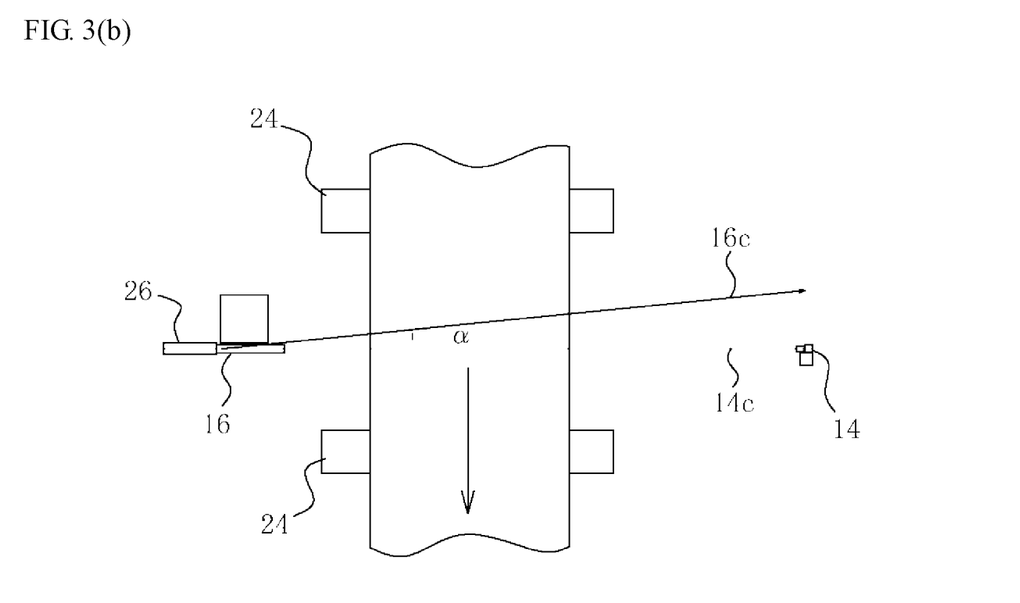

The camera 14 is arranged in one side of the steel sheet (e.g., driving side) at a state of tilting its optical axis 14*c* to a pass line plane PL of the steel sheet. As an arrangement example is concretely shown in FIG. 3, the camera 14 can be fixed to a vertical portion of a mount located between adjacent conveyance rolls 24 in the conveyance direction through a clamp or the like. The pass line plane PL means the upper tangent plane among tangent planes common to the adjacent conveyance rolls 24 in the conveyance direction, or the tangent plane where the lower face of the conveyed strip (steel sheet) passes through.

The tilting angle θ of the optical axis 14c of the camera 14 to the pass line plane PL is preferably not less than 10 degrees but not more than 60 degrees. When the tilting angle θ is less than 10 degrees, an interval between both edges of the steel sheet becomes too narrow in a shooting area of the camera 14, and the edge of the steel sheet may not be detected accurately in the processing of the image. On the other hand, when the tilting angle θ exceeds 60 degrees, the arranging position of the camera 14 becomes higher, and a distance to the steel sheet is increased associated therewith, and hence the detecting accuracy of the edge may decrease. Also, it may be necessary to reconstruct the mount or the like to arrange the camera 14 in a high position, leading to the increase of the cost. FIG. 3 shows an example that the optical axis 14c of the camera 14 is tilted by about 20 degrees to the pass line plane PL.

The light 16 is a bar type LED light, for example, formed by arranging plural LEDs in line. It is arranged in the other side of the steel sheet (a side opposite to the side arranging the camera, or an operation side in this example) and irradiates a light to the steel sheet from behind the steel sheet viewing from the camera 14. The light 16 is not limited to the LED light, and a bar type fluorescent lamp or the like may be used. The light 16 can be fixed to a pole or the like located between the adjacent conveyance rolls 24 in the conveyance direction through a clamp or the like and is preferable to be arranged at a state of tilting to the pass line plane PL to face the camera 14 as shown by an front view in FIG. 3(a). The light 16 is configured so that a part of the light irradiated with an irradiation region larger than the width of the steel sheet passes through the outside of the edge of the steel sheet. However, when the length of the light 16 is too large, an upper part of the light 16 protrudes upward from the pass line plane PL and an accurate edge detection may not be performed due to reflection of the light irradiated from the protruded portion onto the upper face of the steel sheet. Therefore, it is preferable to place a cover 26 onto the protruded portion of the light 16 to shut the light.

As shown by a plan view of the conveyance line in FIG. 3(b), the light 16 and the camera 14 are arranged at the same positions in the conveyance direction of the steel sheet. Thus, when the steel sheet is floated or tilted for some reasons during the conveyance, as shown by a virtual thick line in FIG. 3(a), light from the light 16 is reflected on the upper face of the steel sheet, and the reflected light is made incident on the camera 14 and connects to the light permeated at the edge position of the steel sheet in line, which may cause no detection or false detection of the edge of the steel sheet. In this example, therefore, the optical axis 16c of the light 16 is shifted by an angle α to the optical axis 14c of the camera 14 toward upstream side or downstream side in the conveyance direction (upstream side in the illustrated example). By shifting the optical axis 16c of the light 16 to the optical axis 14c of the camera 14, even if the steel sheet is floated or tilted during conveyance and light from the light 16 is reflected on the upper face of the steel sheet, the incident of the reflected light on the camera can be prevented or made difficult so that S/N of the edge detection in the steel sheet can be improved. Moreover, the angle α is preferably 1 to 10 degrees and is 5 degrees in the illustrated example. When the angle α is less than 1 degree, it is feared that the effect of suppressing incident of the light reflected from the upper face of the steel sheet on the camera 14 cannot be obtained sufficiently, while when the angle α exceeds 10 degrees, brightness of a light irradiated from the light 16 and passing through the edge of the steel sheet is lacking, and the detection accuracy of the edge may decrease.

The image processing device 18 is constructed with a computer comprising a memory for storing various programs, CPU for running these programs and so on, and has a function of automatically detecting the edge by processing an image shot by the camera 14, a function of measuring a meandering amount of the steel sheet from the detected edge, and a function of outputting the measured result to a monitor or the like. Therefore, the image processing device 18 constructs the apparatus 12 of measuring a meandering amount according to the example in cooperation with the camera 14 and the light 16. The image processing device 18 further has a function of judging abnormal meandering based on the measured meandering amount and a function of outputting a signal for decreasing a line speed to a line control device when the abnormality is judged. Therefore, the image processing device 18 constructs the apparatus 10 that detects abnormal meandering according to the example in cooperation with the camera 14 and the light 16.

Figure 6A:
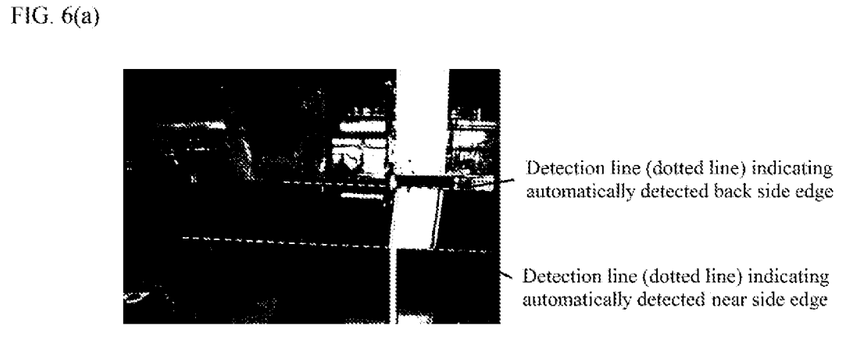
Figure 6B:
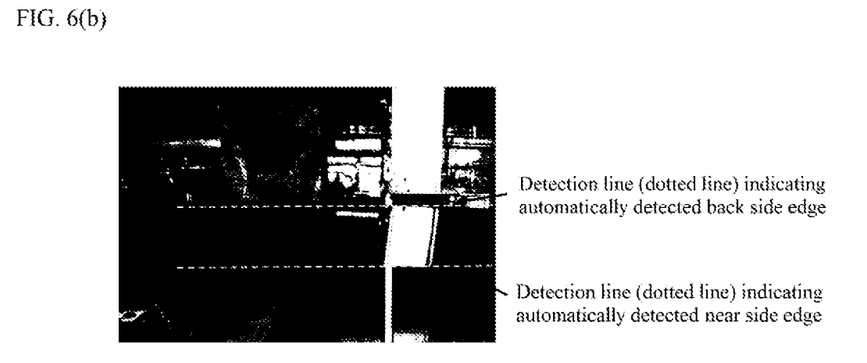
Figure 6C:
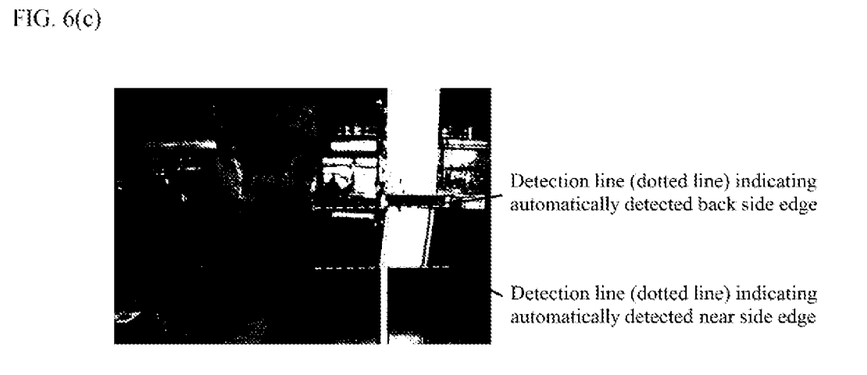
Figure 9:
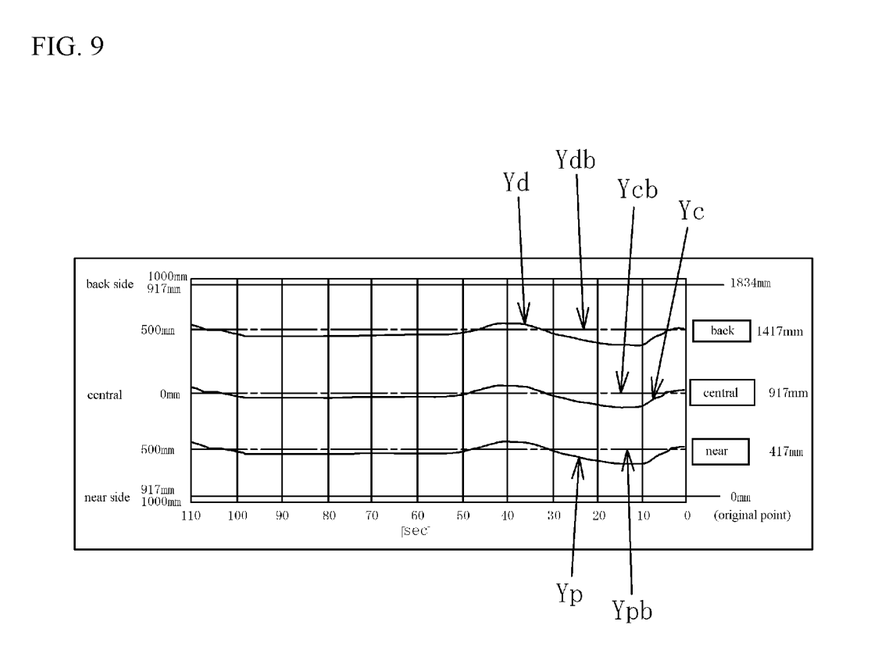
FIG. 9 is a trend graph showing a chronological change of a meandering amount detected by an apparatus that detects abnormal meandering according to an example.

The monitor 22 displays an image shot by the camera 14 and can further display a detection line passing through the detected edge position and extending along the conveyance direction in superimposition with the image (see FIG. 6). The monitor 22 can also display a judgement line corresponding to a "large" meandering amount, which can be set previously and arbitrarily, by a yellow dotted line, for example, or can display a judgement line corresponding to an "abnormal" meandering amount, which can be set previously and arbitrarily, by a red dotted line, for example. Further, when the detection line surpasses the judgement line of the yellow dotted line or the red dotted line, a color of the detection line can be changed into yellow, red or the like so that an operator can visually find the "large" of "abnormal" meandering amount. Also, the monitor 22 cam always or selectively display a setting table of various constants set in the measurement of the meandering amount (see Table 1) or a trend graph showing a chronological change of the meandering amount (see FIG. 9).

Figure 4:
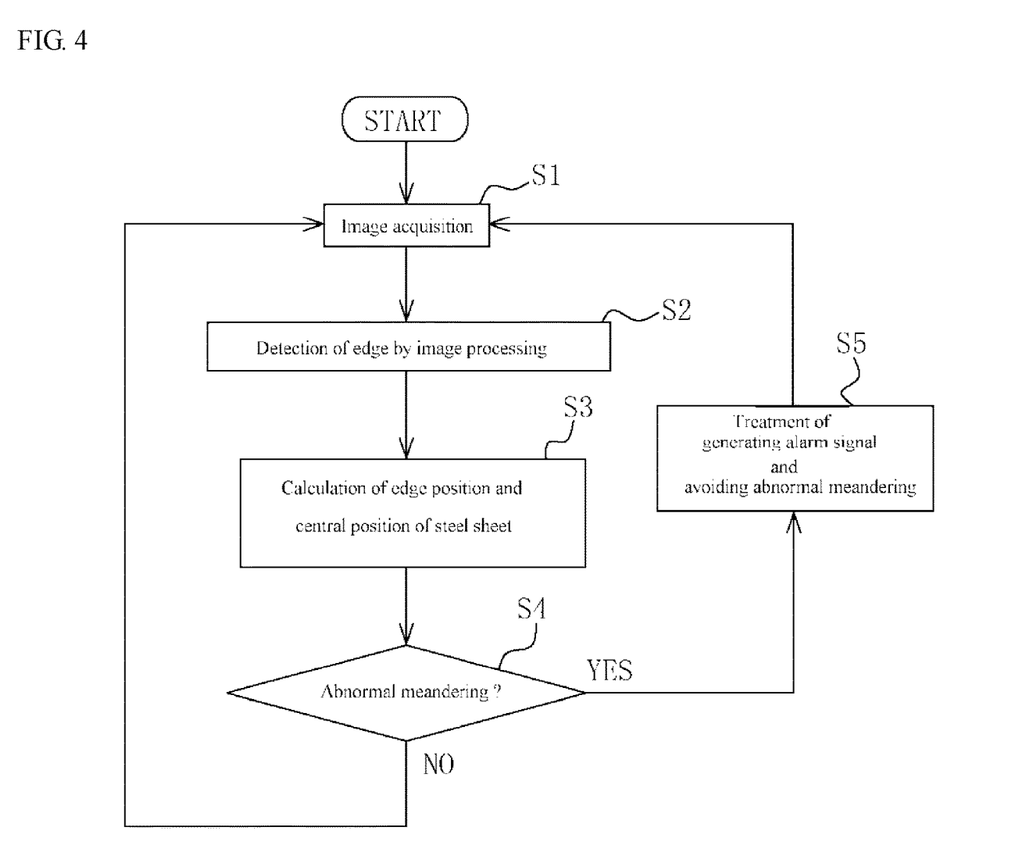
FIG. 4 is a flow chart showing each procedure and processing in a method of detecting abnormal meandering according to the example.

FIG. 4 is a flow chart showing various procedures and treatments performed in the method of measuring a meandering amount and the method of detecting abnormal meandering according to the example by using the image processing device 18.

In step S1, images are first obtained by continuously shooting the steel sheet with the camera 14 from obliquely side to include both edges of the steel sheet.

In step S2, the image obtained in step S1 is processed to detect both edges of the steel sheet.

Figure 5:
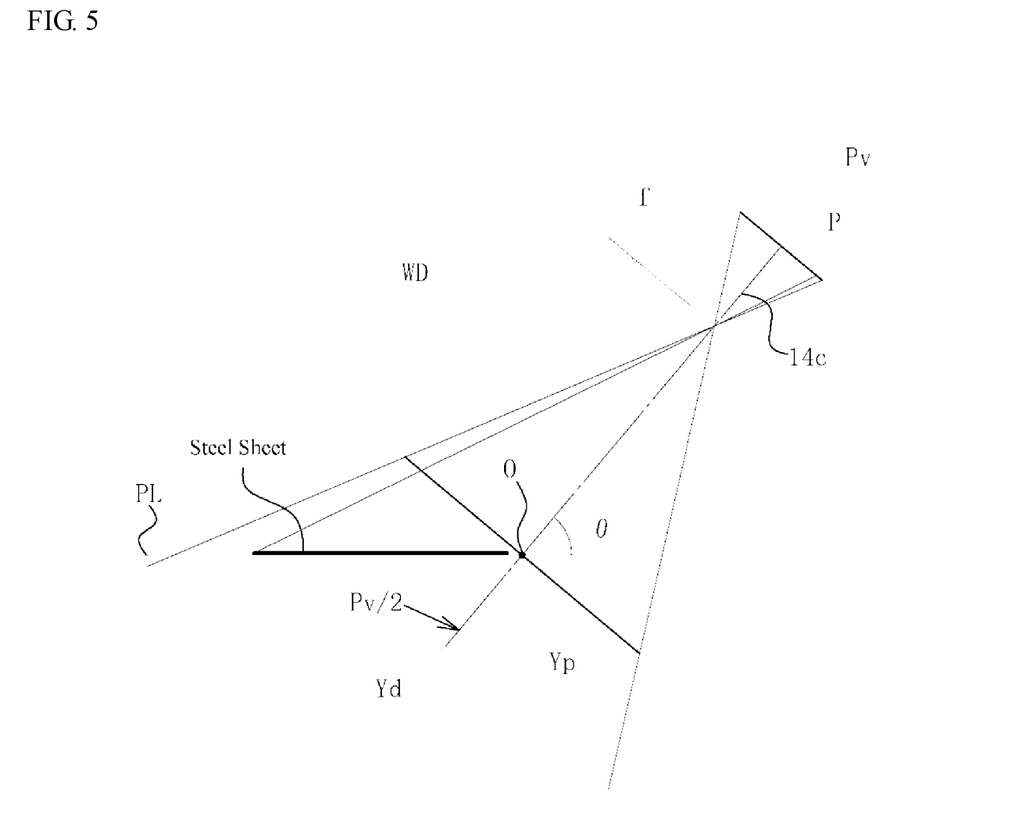
FIG. 5 is a view showing a correspondence relationship between an edge position of an actual strip and the pixel number of the edge position of the strip on an image sensor in an imaging means.

In step S3, positions of both edges of the steel sheet detected in step S2 and a central position of the steel sheet are calculated. The both edge positions and central position of the steel sheet can be determined described below, considering an inclination of the optical axis 14c of the camera 14 to the pass line plane PL. FIG. 5 is a schematic view illustrating a relation between the pixel number P showing the edge position in the image sensor of the camera 14 and an actual edge position in the pass line plane.

First, a point where the optical axis 14c of the camera 14 intersects with the pass line plane PL is determined as the original point O. In this example, the original point O is also a point where a near side edge of the steel sheet viewed from the camera 14 is positioned in an accepted maximum meandering of the steel sheet (hereinafter called as a near side edge simply). Moreover, the original point O is not limited to the above and may be, for example, a central position of the strip in the widthwise direction.

When the pixel number of the image sensor of the camera 14 in the vertical direction (size in the longitudinal direction of the image sensor) is determined as Pv and a focal length is determined as f and a working distance is determined as WD and the pixel number of the edge position in the image sensor is determined as P and an angle between the optical axis 14c of the camera 14 and the pass line plane PL is determined as θ, distances Yp and Yd from the original point O to edge positions of the steel sheet in the widthwise direction along the pass line plane PL are measured by equation (1). Yp is a distance from the original point O to a near side edge along the pass line plane, and Yd is a distance from the original point O to a back side edge (hereinafter called as back-side edge simply) along the pass line plane.

$$Yp, Yd = \frac{WD \cdot (Pv/2 - P)}{f \cdot \sin\theta - \cos\theta \cdot (Pv/2 - P)} \quad (1)$$

Also, a distance Yc from the original point O to a widthwise central position of the steel sheet can be determined from an equation: Yc=(Yp+Yd)/2.

Accordingly, a meandering amount Sp of the steel sheet obtained from position information of the near side edge is determined from another equation: Sp=Yp−Ypb, wherein a distance from the original point O to a standard position of the near side edge is Ypb. Similarly, a meandering amount Sd of the steel sheet obtained from position information of the back side edge is determined from another equation: Sd=Yd−Ydb, wherein a distance from the original point O to a standard position of the rear side edge is Ydb. A meandering amount Sc of the steel sheet obtained from information of widthwise central position of the steel sheet is determined from another equation: Sc=Yc−Ycb, wherein a distance from the original point O to a standard position of widthwise center of the steel sheet is Ycb.

The detection line passing through the detected edge position (detected point) and extending in the conveyance direction can be displayed, for example, by green dotted line in the monitor 22 as shown in FIG. 6. The detection line can be displayed obliquely to a lateral direction of an image shot along the edge of the steel sheet as shown in FIG. 6(a) or can be displayed in parallel to the lateral direction of the image as shown in FIG. 6(b). Also, the detection line can be displayed by making decreasing its length so that a center of each detection line is coincident with the detecting point. Also, the measured meandering amount can be displayed in the monitor.

In step S4, the judgement of abnormal meandering is conducted based on at least one of the meandering amounts measured in step S3. Concretely, the meandering is judged to be "large" or "abnormal" when the measured meandering amount surpasses a predetermined judgement value by comparing the measured meandering amount to the previously set judgement value. When the abnormal meandering is judged ("YES" in step S4), an alarm transmission such as an alarm lamp is generated and control signals for avoiding abnormal meandering such as line speed decreasing signal and line stop signal is output to a line control device in step S5. Also, when abnormal meandering is detected, green detection line showing each edge position can be changed to yellow or red in the monitor 22.

When the meandering amount is judged to be not more than the predetermined judgement value and within an acceptable range in step S4 ("NO" in step S4), the above treatment is continued after the returning to step S1.

By the aforementioned treatment, the meandering amount of the steel sheet can be measured and the abnormal meandering can be detected.

In the method and apparatus for detecting abnormal meandering according to this example, the camera 14 and the light 16 are arranged outside the line (at the side of the steel sheet) so that dust and so on scattering in association with the conveyance of the steel sheet are adhered to lens of the camera 14 and the light 16 to cause operation failure can be reduced. Thus, trucks and rails for drawing the camera 14 and the light 16 toward the outside of the line and reconstruction of the existing equipment associated therewith can be made unnecessary and the cost of introducing the devices can be suppressed. Even when the temperature of the steel sheet is high, the temperature of the side of the steel sheet arranging the camera 14 and the light 16 is lower than that of right above and below the steel sheet so that water cooling device for the camera 14 and the light 16 can be made unnecessary. Since the camera 14 and the light 16 are arranged outside the line, the repairing and adjustment of the camera 14 and the light 16 can be conducted during the operation without stopping the operation so that there is a merit that the maintenance can be conducted easily.

Figure 7:
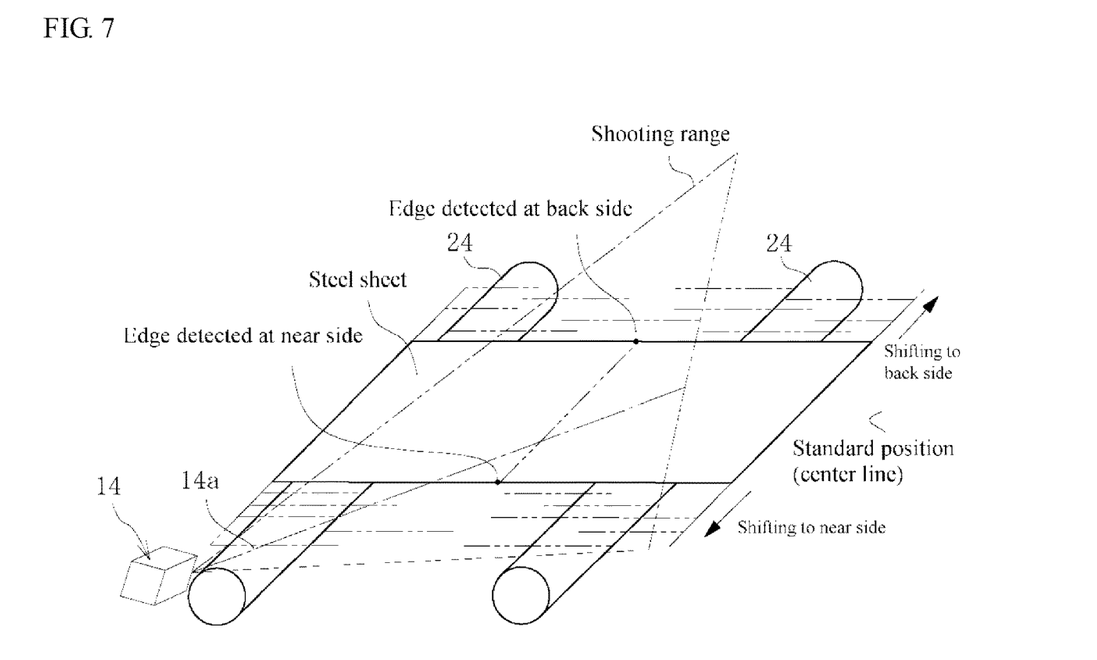
FIG. 7 is a schematic view illustrating a method of constructing regression formula based on experimental results, which is used when a meandering amount is regressively measured from the pixel number (pixel position) of an edge position of a strip detected by an imaging means in a method and apparatus that measures a meandering amount and a method and apparatus for detecting abnormal meandering according to another example.
Figure 8:
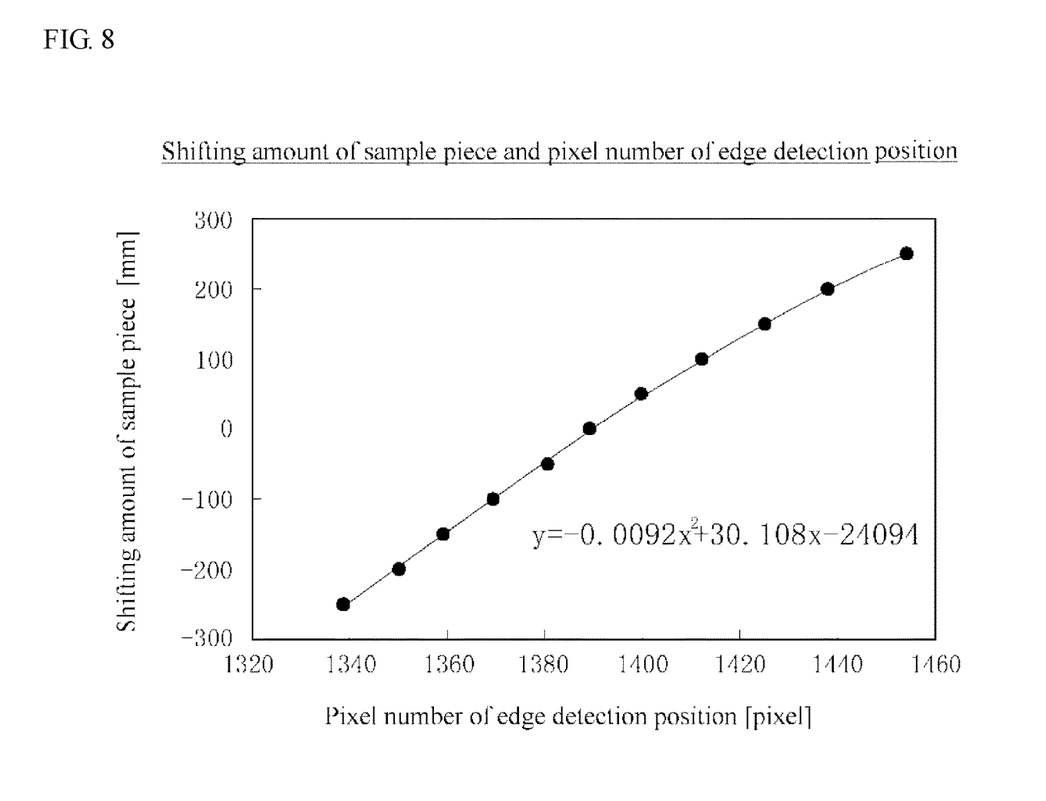
FIG. 8 is a graph showing an example of experimental results obtaining regression formula.

FIG. 7 is a view explaining a method of building a regression formula, which is used when the meandering amount is regressively obtained from the pixel number (pixel position) of the edge position of the steel sheet detected by the camera 14 according to the method and apparatus for measuring a meandering amount and the method and apparatus for detecting abnormal meandering according to another example, based on the experimental results. FIG. 8 is a view illustrating the experimental results. Moreover, the parts and elements similar to those of the preceding example are shown by the same symbols and the explanation thereof is omitted.

In step S3 of the preceding example, the meandering amount of the steel sheet is geometrically determined by equation (1), in consideration of the tilting θ of the optical axis 14c of the camera 14 to the pass line plane PL. In the method and apparatus 12 for measuring a meandering amount and the method and apparatus 10 for detecting abnormal meandering according to this example, the meandering amount is determined by applying the pixel number (pixel position) of the edge position of the steel sheet detected by the camera 14 to the regression formula. As shown, for example, in FIG. 7, the regression formula can be determined by placing the steel sheet (or a sample piece) on conveyance rolls 24 in an actual equipment to match a widthwise central position thereof with a standard position, shooting the steel sheet with an actual camera 14 used in the measurement of the meandering amount to obtain pixel number (pixel position) of the detection position of the steel sheet edge, shifting the steel sheet little by little in each side (for example, every 50 mm) and obtaining pixel number of the detection position of the steel sheet edge every shifting. FIG. 8 is a graph showing measurement results of the pixel number of the detection position of the edge when a sample piece of the steel sheet having a width of 825 mm is used as an example and shifted every 50 mm in each side on the conveyance rolls 24 and shifted to 250 mm in each side at maximum. In this graph, a vertical axis is a shifting amount of the sample piece (meandering amount), wherein a negative value is an example that the sample piece is shifted toward near side viewing from the camera 14 and a positive value is an example that the sample piece is shifted toward back side viewing from the camera 14. A horizontal axis shows the pixel number of the detection position of the edge. In the experimental results, $y=-0.0092x^2+30.108x-24094$ is obtained as a regression formula. Since each coefficient of the regression formula is different in accordance with the widthwise size of the steel sheet even when the same device is used, it is preferable that the regression formula is experimentally measured for each kind of the steel sheets carried and stored in the memory of the image processing device 18.

In the method and apparatus 12 for measuring a meandering amount and the method and apparatus 10 for detecting abnormal meandering according to this example, the image processing device 18 is configured to obtain a pixel number of the detection position of the steel sheet edge in step S2 of FIG. 4 and calculate the meandering amount by substituting the pixel number to x of the regression formula in step S3. In the method and apparatus 12 for measuring a meandering amount and the method and apparatus 10 for detecting abnormal meandering according to this example, therefore, the measurement of working distance (WD) and tilting angle θ of the camera 14 (see FIG. 5), which is difficult to be measured depending on the device, can be omitted to determine the meandering amount more simply. In this example, the treatments other than step S3 are same as in the preceding example so that the explanation thereof is omitted here.

When the meandering amount of the steel sheet is determined regressively from the pixel number of the detection position of the steel sheet edge, the pixel numbers of the edge detection position at both the side portions of the steel sheet may be used, but the pixel number of the edge detection position at the one side portion may be used. In the latter example, the use of the pixel number of the edge detection position at the side near to the camera 14 (near side viewing from the camera 14) is preferable because error is small.

EXAMPLE

As an example, a meandering amount of a steel sheet having a width of 1000 mm, a thickness of 0.5 mm and a surface temperature of 150° C. is measured with an apparatus 12 for measuring a meandering amount having a configuration shown in FIG. 2, which is described below.

As an imaging means is used a CCD camera (area camera) 14 wherein the pixel number in the up and down direction (vertical direction) is 4096 pixels and the pixel number in the horizontal direction (lateral direction) is 5104 pixels. A tilting angle θ of an optical axis 14c of the CCD camera 14 to a pass line plane PL of the steel sheet is 20 degrees. As a light 16 is used a bar type LED light having a length of 2000 mm, which is tilted by 20 degrees to the pass line plane PL to face to the CCD camera 14 and arranged so that an optical axis 16c of the light 16 is shifted by 5 degrees toward an upstream side in the conveyance direction.

A standard position Ypb of near side edge of the steel sheet is at a position 417 mm from the original point O, and a central standard position Ycb of the steel sheet is at a position 917 mm from the original point O, and a standard position Ydb of the back side edge of the steel sheet is at a position 1417 mm from the original point O.

In this example, various coefficients set in the measurement of the meandering amount and the detection of abnormal meandering are shown in a coefficient setting table shown as Table 1. Moreover, each judgement value in this table is a distance from the original point O.

TABLE 1

| | |
|---|---:|
| WD (mm) | 1242 |
| f (mm) | 12 |
| θ (degree) | 20 |
| Judgement value of abnormal meandering in back side edge (mm) | 1834 |
| Judgement value of large meandering in back side edge (mm) | 1684 |
| Judgement value of large meandering in near side edge (mm) | 150 |
| Judgement value of abnormal meandering in near side edge (mm) | 0 |

The measurement of a meandering amount and detection of abnormal meandering are performed by using the apparatus 10 that detects abnormal meandering with the above configuration and settings. The edges can be automatically detected at a detection accuracy of about 1.25 mm (pixel resolution of about 1.25 mm) in the near side edge position (driving side) and a detection accuracy of about 5 mm (pixel resolution of about 5 mm) in the back side edge position (operation side). As shown by a trend graph in FIG. 9, a chronological change of the meandering amount can be confirmed in each edge position and central position of the steel sheet.

Therefore, meandering of the steel sheet can be detected by a simple device with a configuration using one CCD camera 14 and one lighting 16. Since the CCD camera 14 and the light 16 are arranged in the side of the steel sheet having a relatively low temperature, water cooling for the CCD camera 14 and the light 16 is unnecessary. Furthermore, the adhesion of dusts and so on to the lens of the CCD camera 14 and the light 16 is hardly recognized. Since the optical axis 16c of the light 16 is shifted by 5 degrees toward an upstream side in the conveyance direction, incident of reflected light of the lighting 16 to the CCD camera 14 can be prevented, and hence the edge detection can be performed well.

INDUSTRIAL APPLICABILITY

The imaging means and the lighting for detecting meandering of a strip are arranged outside the line (at the side of the strip), and the strip is shot at a state of tilting the imaging means to the pass line plane so that it is possible to suppress the adhesion of dusts to the imaging means and the light to reduce troubles such as operation failure and false detection, and also it is possible to decrease heat load to the imaging means and the lighting to suppress an increase in cost.

The invention claimed is:

1. A method of measuring a meandering amount of a strip during conveyance thereof, comprising:
    arranging one imaging means in one side of the strip at a state of tilting an optical axis thereof to a pass line plane of the strip,
    arranging one lighting in another side of the strip to irradiate light to the strip from a back portion of the strip viewed from the imaging means,
    shooting the strip by the imaging means from an oblique side to include both edges of the strip, and
    detecting the edges of the strip with an image shot by the imaging means, and
    calculating a meandering amount of the strip based on the detected edge position information of the strip from a standard position,
    wherein the lighting and the imaging means are arranged at the same positions in the conveyance direction of the strip, an optical axis of the lighting is shifted to an optical axis of the imaging means toward an upstream side or a downstream side in the conveyance direction of the strip, and calculating the meandering amount includes geometrically determining the meandering amount by equation (1):

$$Yp, Yd = \frac{WD \cdot (Pv/2 - P)}{f \cdot \sin\theta - \cos\theta \cdot (Pv/2 - P)} \qquad (1)$$

in which a pixel number of an image sensor of the imaging means in a vertical direction is determined as Pv,
a focal length is determined as f,
a working distance is determined as WD,
a pixel number of an edge position in the image sensor is determined as P,
an angle between the optical axis of the imaging means and the pass line plane PL is determined as θ,
Yp is a distance from an original point O to a near side edge along the pass line plane,
Yd is a distance from the original point O to a back side edge along the pass line plane, and
a point where the optical axis of the imaging means intersects with the pass line plane PL is determined as the original point O.

2. The method according to claim 1, wherein the meandering amount of the strip is regressively obtained from the detected edge position information of the strip.

3. An apparatus that measures a meandering amount of a strip during conveyance thereof, comprising:
one imaging means arranged in one side of the strip and having an optical axis tilted to a pass line plane of the strip to shoot the strip from an obliquely side to include both edges of the strip,
one lighting that irradiates light to the strip from a back portion of the strip viewed from the imaging means, and
an image processing device that processes an image shot by the imaging means to detect the edges of the strip and calculate a meandering amount of the strip from a standard position based on the detected edge position information of the strip,
wherein the lighting and the imaging means are arranged at the same positions in the conveyance direction of the strip,
an optical axis of the lighting is shifted to an optical axis of the imaging means toward an upstream side or a downstream side in the conveyance direction of the strip, and the calculation of the meandering amount includes a geometrically determination of the meandering amount by equation (1):

$$Yp, Yd = \frac{WD \cdot (Pv/2 - P)}{f \cdot \sin\theta - \cos\theta \cdot (Pv/2 - P)} \qquad (1)$$

in which a pixel number of an image sensor of the imaging means in a vertical direction is determined as Pv,
a focal length is determined as f,
a working distance is determined as WD,
a pixel number of an edge position in the image sensor is determined as P,
an angle between the optical axis of the imaging means and the pass line plane PL is determined as θ,
Yp is a distance from an original point O to a near side edge along the pass line plane,
Yd is a distance from the original point O to a back side edge along the pass line plane, and
a point where the optical axis of the imaging means intersects with the pass line plane PL is determined as the original point O.

4. The apparatus according to claim 3, wherein the meandering amount of the strip is regressively obtained from the detected edge position information of the strip.

5. A method of detecting abnormal meandering comprising:
judging an abnormal meandering when a meandering amount measured by the method as claimed in claim 1 exceeds a predetermined abnormal judgement value.

6. An apparatus that detects abnormal meandering by comprising:
the apparatus as claimed in claim 3,
wherein the image processing device judges abnormal meandering when the measured meandering amount exceeds a predetermined abnormal judgement value.

7. A method of detecting abnormal meandering comprising:
judging an abnormal meandering when a meandering amount measured by the method as claimed in claim 2 exceeds a predetermined abnormal judgement value.

8. An apparatus that detects abnormal meandering by comprising:
the apparatus as claimed in claim 4,
wherein the image processing device judges abnormal meandering when the measured meandering amount exceeds a predetermined abnormal judgement value.

* * * * *